Figure 1:
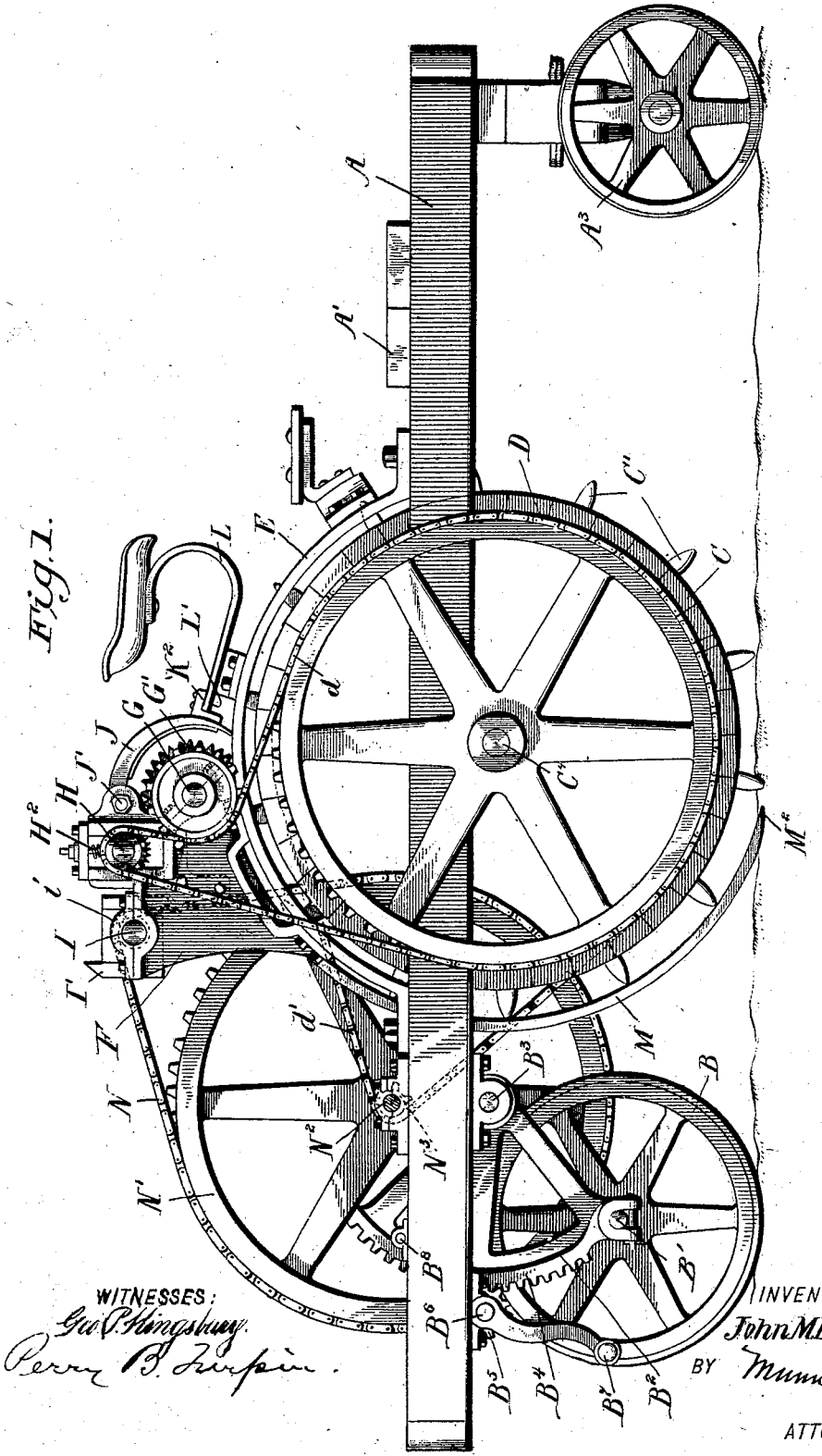

No. 715,535. Patented Dec. 9, 1902.
J. M. BARNES.
FERTILIZING VINE CUTTER.
(Application filed Jan. 30, 1902.)

(No Model.) 3 Sheets—Sheet 1.

WITNESSES:
Geo. P. Kingsbury.
Perry B. Turpin.

INVENTOR
John M. Barnes.
BY Munn & Co.
ATTORNEYS

No. 715,535. Patented Dec. 9, 1902.
J. M. BARNES.
FERTILIZING VINE CUTTER.
(Application filed Jan. 30, 1902.)
(No Model.) 3 Sheets—Sheet 2.
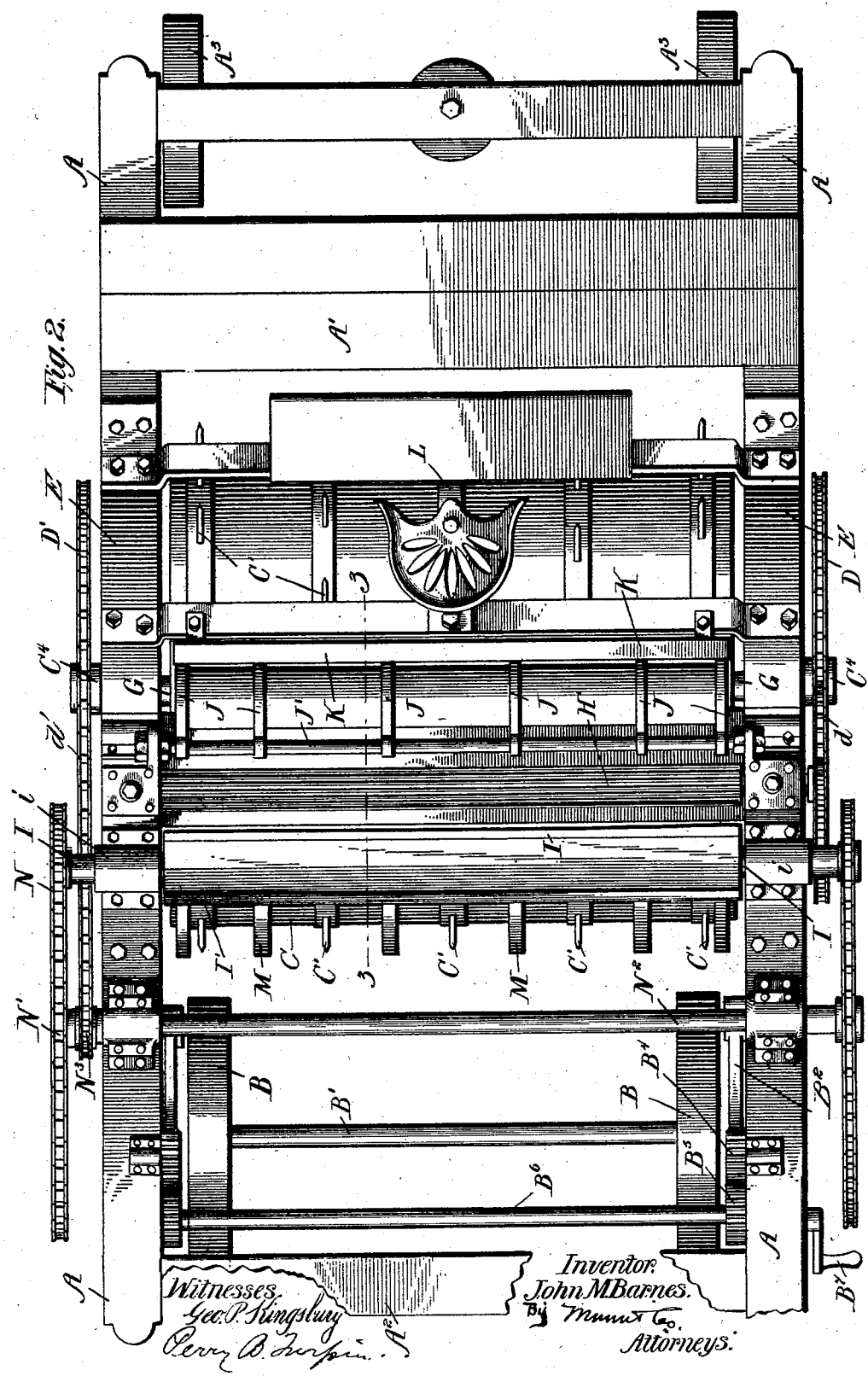
Witnesses
Geo. P. Kingsbury
Perry B. Turpin
Inventor
John M. Barnes
By Munn & Co.
Attorneys No. 715,535. Patented Dec. 9, 1902.
J. M. BARNES.
FERTILIZING VINE CUTTER.
(Application filed Jan. 30, 1902.)
(No Model.) 3 Sheets—Sheet 3.
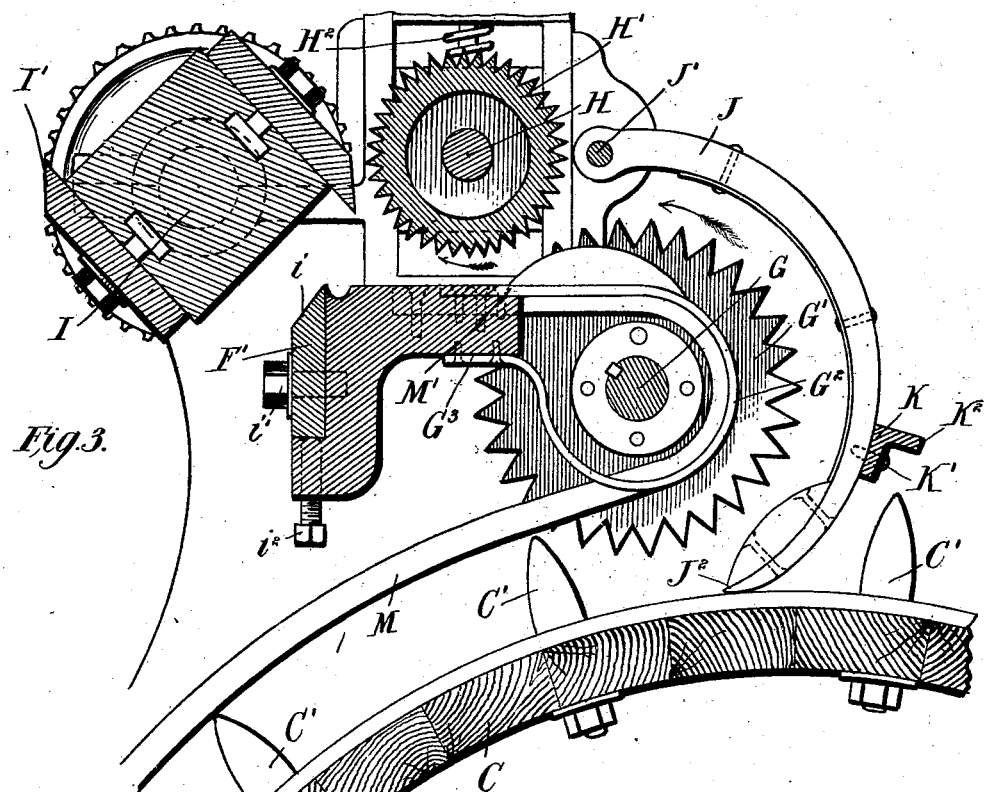
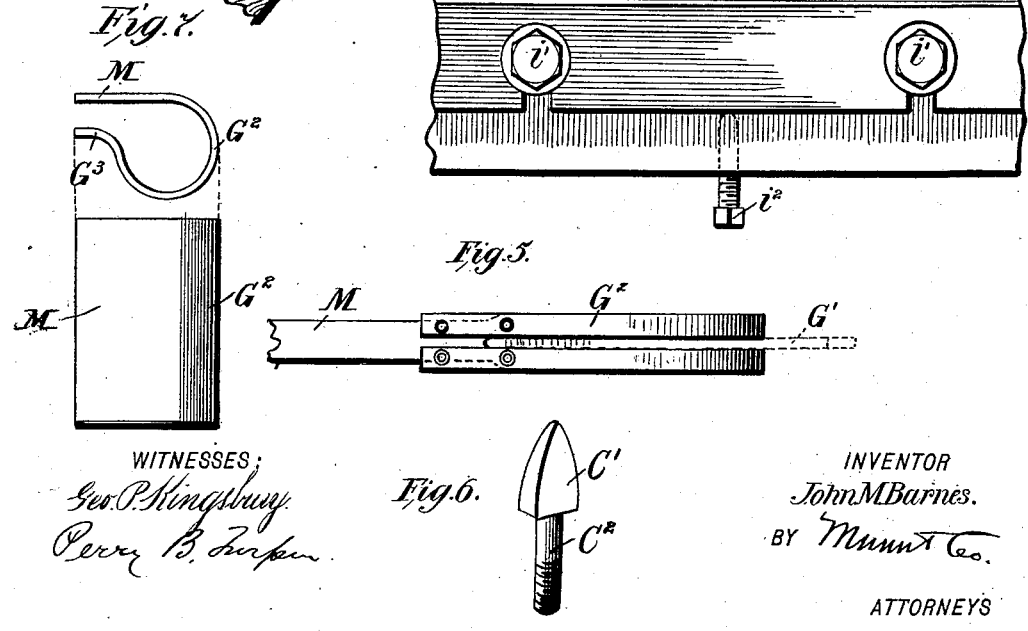
WITNESSES:
Geo. P. Kingsbury
Perry B. Turpen
INVENTOR
John M. Barnes.
BY Munn & Co.
ATTORNEYS

UNITED STATES PATENT OFFICE.

JOHN M. BARNES, OF FRESNO, CALIFORNIA.

FERTILIZING-VINE CUTTER.

SPECIFICATION forming part of Letters Patent No. 715,535, dated December 9, 1902.

Application filed January 30, 1902. Serial No. 91,901. (No model.)

*To all whom it may concern:*

Be it known that I, JOHN M. BARNES, a citizen of the United States, residing at Fresno, in the county of Fresno and State of California, have made certain new and useful Improvements in Fertilizing-Vine Cutters, of which the following is a specification.

My invention is an improvement in vine-cutters for use in cutting up the vines in a vineyard after pruning, so such vines can be utilized for fertilizing purposes; and the invention consists in certain novel constructions and combinations of parts, as will be hereinafter described and claimed.

In the drawings, Figure 1 is a side elevation of my improved machine. Fig. 2 is a top plan view thereof. Fig. 3 is a detail enlarged vertical longitudinal section of a portion of the machine on about line 3 3 of Fig. 2. Fig. 4 is a detail rear elevation of a portion of the fixed cutter and its supporting and adjusting devices. Fig. 5 is a detail top plan view of one of the pairs of springs which operate on opposite sides of the saws. Fig. 6 is a detail perspective view of one of the teeth of the drum, and Fig. 7 is a detail view.

The purpose of the machine is to cut up the vines in a vineyard after the vines have been pruned, in which operation the prunings are thrown in a windrow between the growing vines, and the machine is driven over the prunings and operates to cut them up into short pieces, which are thrown back upon the ground to serve as fertilizer.

In carrying out my invention I provide a suitable framing having side beams A, connected by cross-beams A' and the rear cross-beam A², and suitable supporting guiding-wheels A³ at its front end. These wheels A³, together with the rear wheels B, support the machine in the desired position, and the wheels B are adjustable vertically in order to set the drum into and out of position to operate upon the ground. This may preferably be effected by journaling the axle B' of the wheels B in frames B², which are pivoted at B³ to the main frame and are provided with toothed segments B⁴, which are meshed by pinions B⁵ on a shaft B⁶, which may be turned by the crank B⁷ to adjust the frames B², and with them the wheels B, up or down, as may be desired, bolts B⁸ being supported on the frame in position to enter perforations in the frames B² for the purpose of securing the said frames in any desired adjustment. By this means the wheels B can be readily thrown up or down in order to adjust the drum, presently described, into and out of position to bear upon the ground and feed the vines up through the machine. The drum C, which I term the "main" drum, is suitably journaled in the main frame and is provided on its periphery with the teeth C', preferably arranged in series extending around the circumference of the drum, as shown in Fig. 2, and projecting from the surface of the drum sufficiently far to operate upon the vines and feed the same up through the machine. The teeth C' are preferably formed, as shown in Fig. 6, with a threaded shank C² and may be applied to the drum and secured so they can be conveniently removed whenever desired. The drum, it will be noticed, operates between the side beams A, and the shaft of the drum is extended, preferably at both ends, laterally beyond said beams, as shown at C⁴, and receives the sprocket-wheels D and D', (see Fig. 2,) by which to transmit motion to moving parts of the machine, as will be presently described.

Upon the side beams of the main frame I mount the arches E, which curve upwardly above the drum C and are suitably secured at their ends and form a support for the top frame F, which supports certain of the operating devices, as will be more fully described. This top frame F is provided with bearings for the shafts I, H, and G, which carry the cutting-blades I'; the corrugated feed-roller H', and the saw-disks G', and said frame also affords at F' a support for the base-cutter *i*, which may be secured by the bolts *i'* and adjusted by the screws *i²* and is arranged for coöperation with the revolving cutter, as best shown in Fig. 3. The roller H' is yieldingly supported by means of the springs H². The saw-disks G' are fixed on the shaft G, and springs or guards G² extend partially around the shaft G between the disks G' and are secured at their ends at G³, as best shown in Fig. 3, operating to hold the vines toward the outer edges of the disks, as will be understood from said figure. Strippers J are pivotally supported at J' on the top frame and operate at their free ends at J² upon the drum, as shown in Fig. 3, to strip the vines therefrom and direct the same to the saw-disks. These strippers J are connected by an angular brace K, having one wing K' secured to the strippers, while its other wing K² is secured to a rear extension L' of the seat-supporting bar L. The strippers operate at their free ends J² between the circular rows of teeth C on the drum, as will be understood from the drawings. Rake teeth or bars M are secured at their upper ends at M' to the top frame, extend thence forwardly over the shaft G, thence curve downwardly in front of the said shaft, and thence rearwardly down to their free ends at M², where they rest upon the ground and rake up the vines and hold the same as they are carried by the teeth of the drum until they are caught by the strippers, the rake-teeth further operating to support the vines while they are being carried upwardly and to the rear by the saw-teeth of the disks G', as will be best understood from Fig. 3.

As best shown in Fig. 1, the sprocket or crown wheel D is geared, by means of the sprocket-belt d, with sprocket-wheels on the shafts G and H, so said shafts will be operated in the direction indicated by the arrows in Fig. 3. The rotary cutter has its shaft I provided with a small sprocket-wheel at i, which is geared by a sprocket belt or chain N with a large sprocket-wheel N', whose shaft N² is provided with a small sprocket-wheel N³, which is geared by a sprocket-chain d' with the wheel D' on the shaft of the drum. By this means as the drum is revolved in the operation of the device it will carry the vines gathered by the rake-teeth up to a point where they will be stripped by the strippers J and caught by the feeding-disks G' and carried to the feeding-roller H', which will deliver them to the cutting devices. As before described, the feeding-roller and saw-disks are operated through their shafts by gearing with a sprocket-wheel at one end of the drum, while a sprocket-wheel at the opposite end of the drum is geared to drive the revolving cutters. It will also be noticed that the rake teeth or bars are extended around the feed-shaft G and operate to support the vines while they are being operated upon by the feeding devices carried by said shaft. By preference I provide sprocket-wheels N' and i at opposite ends of their shafts and gear them up by sprocket-chains in order to positively drive both ends of the cutter.

Having thus described my invention, what I claim as new, and desire to secure by Letters Patent, is—

1. The combination of the framing, the drum journaled therein and provided with teeth, the feed-shaft extending adjacent to said drum and provided with toothed disks, the feed-roller journaled adjacent to the said feed-shaft, gearing between the drum and the feed-shaft and roller, the rake-bars extending adjacent to the circumference of the drum and curving at one end partially around the feed-shaft and secured to the framing adjacent to the feed-roller, the strippers, and the cutting devices and means whereby the same may be operated substantially as set forth.

2. A machine for cutting vines comprising a toothed drum to run upon the ground, rake-bars coöperating with said drum whereby the vines may be raised from the ground, a cutting mechanism for cutting up the vines so raised, and feeding devices for delivering the vines to the cutter substantially as set forth.

3. The combination with the cutter, the toothed drum, and feeding devices including a shaft located in advance of the cutting devices, of the rake-bars secured at one end to the framing and curving thence partially around said shaft and extending at their free ends adjacent to the ground substantially as set forth.

4. The combination in a vine-cutter of the toothed drum, the rake-bars coöperating therewith, the feeding devices, the stripping devices for delivering the vines from the drum to the feeding devices, the cutting devices to which the vines are delivered by the feeding devices, sprocket-wheels on opposite ends of the drum, gearing between one of said sprocket-wheels and the feeding devices and between the other of said sprocket-wheels and the cutting devices substantially as set forth.

5. The combination of the main frame provided with bearings for the drum, the drum journaled in said main frame, the arch-bars extending over the drum and secured to the main frame, the top frame supported on said arch-bars and provided with bearings for the cutting devices and the feed devices, the strippers supported by the top frame and operating adjacent to the drum, the feed devices, the cutter, and gearing between the said cutter and feed devices and the drum, substantially as set forth.

6. The combination of the main frame, the toothed drum, the rake-bars, the feed-shaft having the feeding-disks, the strippers by which to deliver the vines from the drum to the feeding-disks, the feed-roller to which the vines are delivered by the feeding-disks, the cutter arranged to operate on the vines delivered by the feeding-roller, and means for operating the feed devices and the cutter substantially as set forth.

7. The combination of the main frame, the top frame, the arch-bars carrying the top frame and supported on the main frame, the drum journaled in the main frame, the rake-teeth carried by the top frame and extending adjacent to the drum, and feed and cutting devices supported in the top frame and arranged for operation substantially as described.

8. The combination with the framing and the toothed drum of the rake-bars for holding the vines as they are elevated by the drum, a cutter for cutting up the vines, and feed devices between the drum and the cutter by which to deliver the vines from the drum to the cutter, and means for operating the feeding devices and the cutter substantially as set forth.

JOHN M. BARNES.

Witnesses:
STANTON CARTER,
BEN EPSTEIN.